United States Patent Office 3,492,332
Patented Jan. 27, 1970

3,492,332
ISOCYANATO ALKYL ESTERS OF
AROMATIC ACIDS
Adnan A. R. Sayigh, North Haven, and Henri Ulrich, North Branford, Conn., assignors to The Upjohn Company, Kalamazoo, Mich., a corporation of Delaware
No Drawing. Filed Dec. 20, 1966, Ser. No. 603,121
Int. Cl. C07c 101/54, 101/60
U.S. Cl. 260—471      3 Claims

ABSTRACT OF THE DISCLOSURE

Novel diisocyanates which are di(isocyanatoalkyl) esters of N-carboxyaminobenzoic acids, useful in the preparation of polyurethanes.

BACKGROUND OF THE INVENTION

Field of the invention

This invention relates to novel diisocyanates and polyurethanes derived therefrom and is more particularly concerned with novel di(isocyanatoalkyl) esters of N-carboxyaminobenzoic acids and with methods for their preparation, and with polyurethanes derived therefrom.

Description of the prior art

Numerous diisocyanates and polyisocyanates, derived from aliphatic, araliphatic and aromatic polyamines by phosgenation, have been described in the art and are known to be useful in the preparation of polyurethanes both cellular and non-cellular; see, for example, Saunders et al. Polyurethanes, Chemistry and Technology, Part II, Interscience, New York, 1964. However, di(isocyanatoalkyl) esters of N-carboxyaminobenzoic acids have not been described heretofore and this invention makes these compounds available for the first time.

SUMMARY OF THE INVENTION

The novel compounds of the invention can be represented by the following formula:

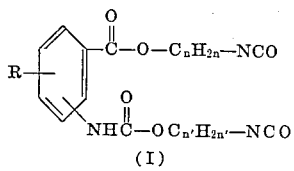

(I)

wherein $C_nH_{2n}$ and $C_{n'}H_{2n'}$ each represent lower-alkylene and R represents from 0 to 4 substituents selected from the class consisting of lower-alkyl, lower-alkenyl, lower-alkoxy, lower-alkenyloxy, lower-alkylthio, halo, nitro, cyano, thiocyano, and carbo(lower-alkoxy).

The term "lower-alkylene" as used throughout this specification and claims means alkylene having from 2 to 8 carbon atoms, inclusive, such as ethylene, 1,2-propylene, 1,3-propylene, 1,4-butylene, 1,5-amylene, 1,3-hexylene, 1,4-heptylene, 1,8-octylene, and the like. The term "lower-alkyl" as used throughout the specification and claims means alkyl from 1 to 8 carbon atoms, inclusive, such as methyl, ethyl, propyl, butyl, pentyl, hexyl, heptyl, octyl, and isomeric forms thereof. The term "lower alkenyl" as used throughout the specification and claims means alkenyl containing from 3 to 8 carbon atoms, inclusive, such as allyl, butenyl, pentenyl, hexenyl, heptenyl, octenyl, and isomeric forms thereof. The term "lower-alkoxy" as used throughout the specification and claims means alkoxy wherein the alkyl residue is lower-alkyl as hereinbefore defined. The term "lower-alkenyloxy" as used throughout the specification and claims means alkenyloxy wherein the alkenyl residue is lower-alkenyl as hereinbefore defined. The term "lower-alkylthio" as used throughout the specification and claims means alkylthio wherein the alkyl residue is lower-alkyl as hereinbefore defined. The term "halo" as used throughout the specification and claims means fluoro, chloro, bromo, and iodo. The term "carbo(lower-alkoxy)" as used throughout the specification and claims means carbalkoxy wherein the alkyl residue is lower-alkyl as hereinbefore defined.

The compounds of the Formula I are useful as intermediates in the preparation of polyurethanes both cellular and non-cellular. For this purpose the diisocyanates (I) are utilised in the manner, and according to the procedures, well-known in the art for the conversion of diisocyanates to polyurethanes; see Saunders et al., supra. The polyurethanes so prepared are useful for a wide variety of purposes well-recognised in the art. For example, flexible polyurethane foams prepared from the diisocyanates (I) in accordance with the methods cited above, are useful as upholstery, bedding and cushioning materials, while semi-rigid polyurethane foams are useful in the preparation of crash pads, and the like shock absorbing materials. Non-cellular polyurethanes, prepared from the diisocyanates (I) in accordance with the above cited methods, are useful for a variety of mechanical applications depending upon hardness and strength properties; for example, by adjusting the physical properties in accordance with methods well-known in the art, such materials can be used as gaskets, seals, caulking compositions, gear wheels, sprockets and the like.

The novel compounds of Formula I are prepared conveniently from the corresponding isocyanatobenzoyl chlorides having the formula:

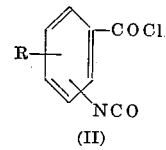

(II)

wherein R is as hereinbefore defined. The preparation is accomplished by bringing together the isocyanatobenzoyl chloride (II) and the appropriate alkanolamine hydrohalide $HOC_nH_{2n}NH_2 \cdot H$-Hal (III) wherein $C_nH_{2n}$ has the significance hereinbefore defined and Hal represents halogen, preferably bromo or chloro. When the alkylene groups $C_nH_{2n}$ and $C_{n'}H_{2n'}$ in the desired compound (I) are identical the proportion of alkanolamine hydrohalide (III) employed in the reaction with the acid chloride (II) is at least 2 moles of (III) per mole of (II) whereby the reaction product is the dihydrohalide of the corresponding diamine having the formula:

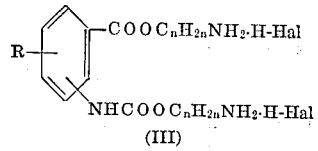

(III)

When it is desired to produce a final compound (I) wherein the alkylene groups $C_nH_{2n}$ and $C_{n'}H_{2n'}$ are different, the above reaction between alkanolamine hydrohalide and deisocyanatobenzoyl chloride is carried out in two steps. In the first of said steps 1 molar proportion of an alkanolamine hydrohalide $HOC_{n'}H_{2n'}NH_2 \cdot H$-Hal (IV), wherein $C_{n'}H_{2n'}$ and Hal are as hereinbefore defined, is reacted with 1 molar proportion of isocyanatobenzoyl chloride (II) to produce an intermediate having the formula:

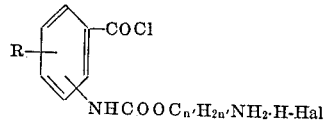

The latter compound is then reacted with a molar proportion of a second alkanolamine hydrohalide (III) wherein the alkylene chain $C_nH_{2n}$ differs from that ($C_{n'}H_{2n'}$) in the alkanolamine hydrohalide (IV). There is thereby obtained the desired intermediate diamine dihydrohalide having the formula:

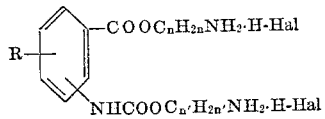

wherein R and Hal are as hereinbefore defined and $C_nH_{2n}$ and $C_{n'}H_{2n'}$ are different and are each as hereinbefore defined.

The reaction between the isocyanatobenzoyl chloride (II) and either, or successively both, alkanolamine hydrohalides (III) and (IV) is generally conducted in the presence of an inert organic solvent. The latter is an organic solvent which does not react with either of the reactants or in any way interfere with the course of the reaction. Examples of inert organic solvents are benzene, chlorobenzene, dichlorobenzene, toluene, xylene, Decalin, tetradecalin, hexane, heptane, and the like. The reaction between the acid chloride (II) and the alkanolamine hydrohalide is generally exothermic and proceeds rapidly. If necessary the reaction, or each step of the reaction if it is carried out in two steps using different alkanolamine hydrohalides in each step, can be completed by raising the temperature of the reaction mixture, for example, to reflux, for a short period.

If desired, the intermediate diamine hydrohalide obtained as described above can be isolated before being subjected to the next stage of the reaction. For example, the diamine hydrohalide generally separates from the reaction mixture as a solid and can be isolated by filtration and, if necessary, purified by recrystallisation or other conventional procedures. However such isolation and purification is unnecessary and the reaction mixture from the above condensation can generally be used, without any further treatment, in the conversion of the diamine to be desired diisocyanate. Thus the reaction mixture obtained as described above can be treated with phosgene at a temperature of about 100° to about 180° C. until conversion of the diamine to the desired diisocyanate (I) is complete. Completion of the reaction can be followed by routine analytical procedures such as infrared spectroscopic analysis, but is conveniently detected visually by the clarification of the reaction mixture which usually occurs when the phosgenation is completed.

The desired diisocyanate (I) can be isolated from the reaction mixture by conventional procedures, for example, by removal of the solvent by distillation followed by purification of the residual diisocyanate (I) such as countercurrent distribution in the case of a liquid or recyrstallisation in the case of a solid.

The isocyanatobenzoyl chlorides (II), which are employed as starting materials in the preparation of the compounds (I) of the invention, can be prepared by procedures known in the art. For example, the m- and p-isocyanatobenzoyl chlorides of Formula II can be prepared by phosgenation of the corresponding m- and p-aminobenzoic acids. Advantageously but not essentially the phosgenation is carried out in the presence of a catalyst selected from the group consisting of N-alkyl-N-(alkyl or aryl)-substituted formamides or alkanoamides, N-alkyllactams, N-alkyl-N-(alkyl or aryl)-N'-arylformamidines or alkanamidines, or N,N'-dialkyl-N,N'-di(alkyl or aryl)-N''-arylguanidines. Illustrative of such catalysts are dimethylformamide, diethylformamide, N-methyl-N-isopropylformamide, N,N-dihexylformamide, N,N-dimethylacetamide, N-ethyl-N-isopropylbutyramide, N,N-dimethylhexanoamide, N-formylpyrrolidine, N-formylhexamethyleneimine, N-acetylpyrrolidine, N-butyrylpyrrolidine, N-methylformanilide, N-methylacetanilide, N-ethylacetanilide, N-methylbutyrolactam, N-butylbutyrolactam, N-methyl-ε-caprolactam, N,N,N',N'-tetramethyl-N''-phenylguanidine, N,N-dimethyl-N',N'-diethyl-N''-phenylguanidine, N,N-dimethyl-N'-phenylformamidine, N,N-dimethyl-N'-phenylacetamidine, and the like. The amount of said catalyst employed in the phosgenation is generally within the range of about 0.1 to about 10% by weight, based on aminobenzoic acid. Higher amounts of catalyst can be employed if desired but offer little advantage in performance on a time-yield basis over amounts within the above range. Preferably the amount of catalyst employed is of the order of about 1% to about 3% by weight based on aminocarboxylic acid.

The phosgenation of the aminobenzoic acid to the desired isocyanatobenzoyl chloride is accomplished by procedures well-known in the art for the phosgenation of aromatic amines with the additional feature that a catalyst of the type described above is incorporated in the reaction mixture either in a single batch at the beginning of phosgenation or portionwise throughout the phosgenation. The details of said procedure are exemplified in the Preparations 1 and 2 below.

The o-isocyanatobenzoyl chlorides falling within the Formula II can be prepared similarly by phosgenation of the corresponding o-aminobenzoic acids but in this case the presence of a catalyst of the type described above is essential, not optional, in order to obtain significant yields of the desired product. Alternatively the corresponding isatoic anhydride can be used in said phosgenation in place of the o-aminobenzoic acid. The isatoic anhydride can be prepared, for example, from the appropriate o-aminobenzoic acid using phosgene in the absence of a catalyst using the procedure of Iwakura et al. J. Org. Chem. 31, 142, 1966. Alternatively the isatoic anhydrides can be prepared as described by O'Sullivan et al. J. Chem. Soc. 1957, 2916 by oxidation, using chromic acid in acetic acid, of the corresponding isatins, which latter in turn are prepared from the correspondingly substituted aniline using the procedure described by O'Sullivan et al. ibid, 1956, 2207. The o-, m-, and p-aminobenzoic acids which are employed to prepare the compounds (II) are for the most part known in the art and can be obtained by conventional procedures such as those described in Chemistry of Carbon Compounds, Ed. by E. H. Rodd, vol. IIIA, p. 576 et seq. Elsevier, New York, 1954.

The following preparations and examples illustrate the best mode contemplated by the inventors for carrying out their invention but are not to be construed as limiting the scope thereof.

PREPARATION 1

To a mixture of 27.4 g. (0.2 mole) of p-aminobenzoic acid in 200 ml. of o-dichlorobenzene maintained at 150° to 168° C. was added phosgene at a rate of 2 g. per minute and a solution of 1.4 g. of dimethylformamide in 50 ml. of o-dichlorobenzene at such a rate that all the solution had been added after 45 minutes. The addition of phosgene was continued for a further 75 minutes after catalyst addition was complete. The resulting solution was then maintained at about 150° C. and purged with nitrogen for 30 minutes. The purged solution was then distilled under reduced pressure to remove o-dichlorobenzene and the residue was distilled in vacuo to obtain 19.5 g. (54% theoretical yield) of p-isocyanatobenzoyl chloride having a boiling point of 69° C. at 0.2 mm. of mercury which solidified on standing to a solid having a melting point of 32° to 34° C.

Similarly, using the above procedure but replacing p-aminobenzoic acid by the known compounds m-aminobenzoic, 3-amino-2-propoxybenzoic, 4-amino-2-propoxybenzoic, 2 - allyloxy-4-aminobenzoic, 4 - amino-2-bromobenzoic, 5-amino-2-chlorobenzoic, 3-amino-2,5-dichlorobenzoic, 3-amino-2,6-dimethylbenzoic, 3-amino-4-ethoxybenzoic, 4-amino-2-ethylthiobenzoic, 4-amino-2-isobutoxybenzoic, 4-amino-3-nitrobenzoic, 3-amino-4-isopropenylbenzoic, 5-thiocyano - 2 - aminobenzoic, 2-amino-5-cyanobenzoic, or 3-carboxymethyl-2-aminobenzoic acids (the latter prepared by reduction of 2-nitroisophthalic acid 1-methyl ester) there are obtained m-isocyanato-, 3-isocyanato-2-propoxy, 4-isocyanato-2-propoxy-, 2-allyloxy-4-isocyanato-, 2-bromo-4-isocyanato-, 2-chloro-5-isocyanato-, 2,5-dichloro-3-isocyanato-, 2,6-dimethyl-3-isocyanato-, 4-ethoxy-3-isocyanato-, 2-ethylthio-4-isocyanato-, 2-isobutoxy-4-isocyanato-, 4-isocyanato-3-nitro-, 3-isocyanato-4-isopropenyl-, 2-isocyanato-5-*t*hiocyano-, 5-cyano-2-isocyanato-, and 3-carboxymethyl - 2 - isocyanatobenzoyl chlorides, respectively.

PREPARATION 2

A mixture of 79 g. (0.4 mole) of 5-chloroisatoic anhydride and 1.6 g. (2% by weight) of dimethylformamide in 600 ml. of chlorobenzene was stirred and phosgene was passed into the mixture at a rate of 1 g./minute. The mixture was heated to reflux and maintained thereat for 85 minutes while the phosgene stream was continued. At the end of this time a second portion of 1.6 g. (2% by weight based on anhydride) was added and the phosgenation at reflux was continued for a further 35 minutes at which time the solution was clear. The resulting product was cooled and filtered. The filtrate was evaporated to dryness and the residue was triturated with ligroin to obtain 45.5 g. (52.5% theoretical yield) of 2-isocyanato-5-chlorobenzoyl chloride in the form of a solid having a melting point of 50° to 60° C. The infrared absorption spectrum of this material (chlorobenzene solution) exhibited maximum at 4.4µ, 5.62µ and 5.74µ.

Using the procedure described above, but replacing 5-chloroisatoic anhydride by the known compound 6-carbomethoxy-, 4-chloro-, 3-bromo-, 6-fluoro-, 3,5-dibromo-, 3,5-dichloro-, 3,5-diiodo-, 6-ethyl, 6-propyl-, 3-methyl-, or 6-trifluoromethylisatoic anhydride, there are obtained 6-carbomethoxy-, 4-chloro-, 3-bromo-, 6-fluoro-, 3,5-dibromo-, 3,5-dichloro-, 3,5-diioddo-, 6-ethyl-, 6-propyl-, 3-methyl-, and 6-trifluoromethyl-2-isocyanatobenzoyl chlorides, respectively.

EXAMPLE 1

2-isocyanatoethyl N-2-isocyanatoethoxy-carbonylanthranilate

To a solution of 9.07 g. (0.05 mole) of 2-isocyanatobenzoyl chloride in 90 ml. of chlorobenzene was added 9.7 g. (0.1 mole) of ethanolamine hydrochloride and the mixture was heated to reflux and maintained thereat for 6 hr. during which time phosgene was passed into the mixture at a rate of 1 g./minute. At the end of this period a clear solution remained. This solution was purged with nitrogen and the solvent removed therefrom by distillation. The residue (15.4 g.) was 2-isocyanatoethyl N-2-isocyanatoethoxycarbonyl anthranilate in the form of a liquid. The infrared spectrum of the compound (chloroform solution) exhibited maxima at 2.9µ, 4.4µ, 5.65 (sh.)µ, and 5.82µ.

EXAMPLE 2

2-isocyanatoethyl 5-chloro-N-2-isocyanato-ethoxycarbonylanthranilate

Using the procedure described in Example 1, but replacing 2-isocyanatobenzoyl chloride by 5-chloro-2-isocyanatobenzoyl chloride, there is obtained 2-isocyanatoethyl 5-chloro-N-2-isocyanatoethoxycarbonylanthranilate.

Similarly, using the procedure described in Example 1, but replacing 2-isocyanatobenzoyl chloride by 3-isocyanato-, 3-isocyanato-2-propoxy-, 4-isocyanato-2-propoxy-, 2-allyloxy-4-isocyanato-, 2-bromo-4-isocyanato-, 2-chloro-5-isocyanato, 2,5-dichloro-3-isocyanato-, 2,6-dimethyl-3-isocyanato-, 4-ethoxy - 3 - isocyanato-, 2-ethylthio-4-isocyanato-, 2-isobutoxy-4-isocyanato-, 4-isocyanato-3-nitro-, 3-isocyanato-4-isoprenyl-, 2-isocyanato-5-thiocyano-, 5-cyano-2-isocyanato-, and 3-carbomethoxy-2-isocyanatobenzoyl chlorides, there are obtained:

2-isocyanatoethyl 3-[N-2-isocyanatoethoxycarbonyl-amino]benzoate, 2-isocyanatoethyl 2-propoxy-3-[N-2-isocyanatoethoxycarbonylamino]benzoate,
2-isocyanatoethyl 2-propoxy-4-[N-2-isocyanatoethoxycarbonylamino]benzoate,
2-isocyanato 2-allyloxy-4-[N-2-isocyanatoethoxycarbonylamino]benzoate,
2-isocyanatoethyl 2-bromo-4-[N-2-isocyanatoethoxycarbonylamino]benzoate,
2-isocyanatoethyl 2-chloro-5-[N-2-isocyanatoethoxycarbonylamino]benzoate,
2-isocyanatoethyl 2,5-dichloro-3-[N-2-isocyanatoethoxycarbonylamino]benzoate,
2-isocyanatoethyl 2,6-dimethyl-3-[N-2-isocyanatoethoxycarbonylamino]benzoate,
2-isocyanatoethyl 4-ethoxy-3-[N-2-isocyanatoethoxycarbonylamino]benzoate,
2-isocyanatoethyl 2-ethylthio-4-[N-2-isocyanatoethoxycarbonylamino]benzoate,
2-isocyanatoethyl 2-isobutoxy-4-[N-2-isocyanatoethoxycarbonylamino]benzoate,
2-isocyanatoethyl 3-nitro-4-[N-2-isocyanatoethoxycarbonylamino]benzoate,
2-isocyanatoethyl 4-isopropenyl-3-[N-2-isocyanatoethoxycarbonylamino]benzoate,
2-isocyanatoethyl 5-thiocyano-2-[N-2-isocyanatoethoxycarbonylamino]benzoate,
2-isocyanatoethyl 5-cyano-2-[N-2-isocyanatoethoxycarbonylamino]benzoate, and
2-isocyanatoethyl 3-carbomethoxy-2-[N-2-isocyanatoethoxycarbonylamino]benzoate, respectively.

EXAMPLE 3

2-isocyanatopropyl N-2-isocyanatopropoxycarbonyl-anthranilate

Using the procedure described in Example 1, but replacing ethanolamine hydrochloride by isopropanolamine hydrobromide, there is obtained 2-isocyanatopropyl N-2-isocyanatopropoxycarbonylanthranilate.

Similarly, using the procedure described in Example 1, but replacing ethanolamine hydrochloride by 4-hydroxybutylamine, 4-hydroxyhexylamine, or 8-hydroxyoctylamine, there are obtained 4-isocyanatobutyl N-4-isocyanatobutoxycarbonylanthranilate, 4-isocyanatohexyl N-4-isocyanatohexyloxycarbonylanthranilate, and 8-isocyanatooctyl N-8-isocyanatooctyloxycarbonylanthranilate, respectively.

EXAMPLE 4

2-isocyanatopropyl N-2-isocyanatoethoxycarbonyl-anthranilate

To a solution of 9.07 g. (0.05 mole) of 2-isocyanatobenzoyl chloride in 90 ml. of chlorobenzene is added 4.85 g. (0.05 mole) of ethanolamine hydrochloride and the mixture is stirred for 30 minutes after addition is complete. To the resulting mixture is added 5.57 g. (0.05 mole) of isopropanolamine hydrochloride and the mixture is stirred for approximately 30 minutes before being heated to reflux. The reaction mixture is maintained at reflux temperature and phosgene is passed into the mixture at approximately 1 g./minute until a clear solution is obtained. The resulting solution is purged with nitrogen and the solvent removed therefrom by distillation. The residue is 2-isocyanatopropyl N-2-isocyanatoethoxycarbonylanthranilate.

We claim:
1. A diisocyanate having the formula:

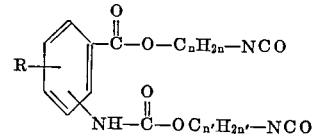

wherein $C_nH_{2n}$ and $C_{n'}H_{2n'}$ each represent lower-alkylene and R represents from 0 to 2 substituents selected from the class consisting of lower-alkyl, lower-alkoxy, lower-alkenyloxy, lower-alkylthio, halo, nitro, cyano, thiocyano and carbo(lower-alkoxy).

2. The compound of claim 1 wherein the benzene nucleus is unsubstituted and each of $C_nH_{2n}$ and $C_{n'}H_{2n'}$ represents —$CH_2CH_2$—, said compound being 2-isocyanatoethyl N-(2-isocyanatoethoxycarbonyl)anthranilate.

3. The compound of claim 1 wherein R is 5-chloro and each of $C_nH_{2n}$ and $C_{n'}H_{2n'}$ is —$CH_2CH_2$—, said compound being 2-isocyanatoethyl 5-chloro-N-(2-isocyanatoethoxycarbonyl)anthranilate.

References Cited

Frieser, L. F. et al.: Organic Chemistry (1956), Reinhold Publishing Corp., N.Y., pp. 182 and 608 relied on.

LORRAINE A. WEINBERGER, Primary Examiner

L. A. THAXTON, Assistant Examiner

U.S. Cl. X.R.

260—77.5, 454, 465, 470